United States Patent
Yamaguchi et al.

(10) Patent No.: US 9,966,605 B2
(45) Date of Patent: May 8, 2018

(54) NON-AQUEOUS ELECTROLYTE SECONDARY BATTERY

(71) Applicants: NISSAN MOTOR CO., LTD., Yokohama-shi, Kanagawa (JP); AUTOMOTIVE ENERGY SUPPLY CORPORATION, Zama-shi, Kanagawa (JP)

(72) Inventors: Ryuuta Yamaguchi, Yokohama (JP); Takashi Honda, Yokohama (JP); Kousuke Hagiyama, Yokohama (JP); Ikuma Matsuzaki, Yokohama (JP); Takeshi Miyamoto, Yokohama (JP); Osamu Shimamura, Zama (JP); Keisuke Matsumoto, Zama (JP)

(73) Assignees: Nissan Motor Co., Ltd., Yokohama-shi, Kanagawa (JP); Automotive Energy Supply Corporation, Zama-shi, Kanagawa (JP)

( * ) Notice: Subject to any disclaimer, the term of this patent is extended or adjusted under 35 U.S.C. 154(b) by 145 days.

(21) Appl. No.: 14/780,089

(22) PCT Filed: Mar. 26, 2014

(86) PCT No.: PCT/JP2014/058687
§ 371 (c)(1),
(2) Date: Sep. 25, 2015

(87) PCT Pub. No.: WO2014/157419
PCT Pub. Date: Oct. 2, 2014

(65) Prior Publication Data
US 2016/0043401 A1    Feb. 11, 2016

(30) Foreign Application Priority Data
Mar. 26, 2013    (JP) .................................. 2013-064934

(51) Int. Cl.
*H01M 4/62*    (2006.01)
*H01M 2/18*    (2006.01)
(Continued)

(52) U.S. Cl.
CPC ............. *H01M 4/621* (2013.01); *H01M 2/18* (2013.01); *H01M 4/13* (2013.01);
(Continued)

(58) Field of Classification Search
None
See application file for complete search history.

(56) References Cited

U.S. PATENT DOCUMENTS

2003/0124416 A1    7/2003    Kaneta
2004/0048151 A1    3/2004    Hayashi et al.
(Continued)

FOREIGN PATENT DOCUMENTS

EP    1798790 A1    6/2007
JP    2002164076 A    6/2002
(Continued)

*Primary Examiner* — Scott J Chmielecki
(74) *Attorney, Agent, or Firm* — Young Basile Hanlon & MacFarlane, P.C.

(57) ABSTRACT

A non-aqueous electrolyte secondary battery can efficiently discharge the gas generated to the outside of the electrode and exhibits a low decrease in battery capacity even when used for a long period of time in the case of using an aqueous binder as the binder of a negative electrode active material. The non-aqueous electrolyte secondary battery has a positive electrode active material layer is formed on a surface of a positive electrode current collector, a negative electrode active material layer is formed on a surface of a negative electrode current collector, and a separator, wherein the density of the negative electrode active material layer is from 1.3 to 1.6 g/cm³, the negative electrode active material layer contains an aqueous binder, and the surface center line (Continued)

average roughness (Ra) of a surface on a separator side of the negative electrode active material layer is from 0.5 to 1.0 µm.

11 Claims, 3 Drawing Sheets

(51) Int. Cl.
    *H01M 4/13*     (2010.01)
    *H01M 10/052*     (2010.01)
    *H01M 10/04*     (2006.01)

(52) U.S. Cl.
    CPC ..... *H01M 10/0481* (2013.01); *H01M 10/052* (2013.01); *H01M 2220/20* (2013.01); *Y02E 60/122* (2013.01); *Y02T 10/7011* (2013.01)

(56) References Cited

U.S. PATENT DOCUMENTS

| | | | |
|---|---|---|---|
| 2006/0194116 A1* | 8/2006 | Suzuki | H01M 2/166 429/251 |
| 2009/0136848 A1 | 5/2009 | Minami et al. | |
| 2009/0202915 A1 | 8/2009 | Modeki et al. | |
| 2009/0214954 A1 | 8/2009 | Onishi et al. | |
| 2011/0262785 A1* | 10/2011 | Johnson | H01M 2/1077 429/66 |
| 2012/0121965 A1 | 5/2012 | Makin et al. | |
| 2012/0164530 A1 | 6/2012 | Temmyo et al. | |
| 2012/0308898 A1* | 12/2012 | Sawamoto | C08J 5/2256 429/249 |
| 2013/0216919 A1* | 8/2013 | Tokuda | H01M 10/052 429/329 |
| 2013/0260256 A1* | 10/2013 | Kawanaka | H01M 4/386 429/246 |
| 2013/0309564 A1* | 11/2013 | Yoshida | H01M 10/0525 429/200 |

FOREIGN PATENT DOCUMENTS

| | | |
|---|---|---|
| JP | 2005149891 A | 6/2005 |
| JP | 2006073480 A | 3/2006 |
| JP | 2008066278 A | 3/2008 |
| JP | 2010073420 A | 4/2010 |
| JP | 2010080297 A | 4/2010 |
| JP | 2010135265 A | 6/2010 |
| JP | 2010-165580 A | 7/2010 |
| JP | 2011154936 A | 8/2011 |
| JP | 2012124146 A | 6/2012 |
| KR | 20030057482 A | 7/2003 |
| KR | 20090007710 A | 1/2009 |
| WO | 2006025377 A1 | 3/2006 |
| WO | 2012001840 A1 | 1/2012 |

* cited by examiner

NON-AQUEOUS ELECTROLYTE SECONDARY BATTERY

CROSS REFERENCE TO RELATED APPLICATION

The present application claims priority to Japanese Patent Application No. 2013-064934, filed Mar. 26, 2013, incorporated herein in its entirety.

TECHNICAL FIELD

The present invention relates to a non-aqueous electrolyte secondary battery.

BACKGROUND

In recent years, developments of electric vehicles (EV), hybrid electric vehicles (HEV) and fuel cell vehicles (FCV) have been advanced against the background of escalating environmental protection movement. For a power source for driving motors used on those vehicles, a rechargeable secondary battery is suitable. In particular, what is attracting the attention is a non-aqueous electrolyte secondary battery such as a lithium-ion secondary battery expected to provide high capacity and high output.

A non-aqueous electrolyte secondary battery is provided to have a positive electrode active material layer that is formed on a surface of a current collector and includes a positive electrode active material (for example, $LiCoO_2$, $LiMO_2$, or $LiNiO_2$). Additionally, the non-aqueous electrolyte secondary battery is provided to have a negative electrode active material layer that is formed on a surface of a current collector and includes a negative electrode active material (for example, metal lithium, carbonaceous materials such as cokes, natural and synthetic graphite, metal materials including Sn and Si and oxides of them).

A binder for binding an active material which is used for an active material layer is classified into an organic solvent-based binder (binder which is not dissolved/dispersed in water but dissolved/dispersed in an organic solvent) and an aqueous binder (a binder which is dissolved/dispersed in water). The organic solvent-based binder can be industrially disadvantageous due to high cost such as raw material cost for an organic solvent, recovery cost, and cost relating to waste processing. Meanwhile, the aqueous binder has an advantage of lowering a burden on environment and greatly suppressing an investment on facilities of a production line, since water as a raw material is conveniently available and only water vapor is generated during drying. The aqueous binder also has an advantage that, since the aqueous binder has a high binding effect even with a small amount compared to an organic solvent-based binder, it can increase a ratio of an active material per same volume so that a negative electrode with high capacity can be achieved.

From the viewpoint of having those advantages, various attempts have been made for forming a negative electrode by using an aqueous binder as a binder for forming an active material layer. For example, in JP 2010-80297 A, a negative electrode for a non-aqueous electrolyte secondary battery is proposed in which the negative electrode active material layer contains a polyvinyl alcohol and carboxymethylcellulose together with a latex-based binder such as styrene butadiene rubber (SBR) of an aqueous binder.

However, it was found out that in a non-aqueous electrolyte secondary battery containing a negative electrode active material layer using an aqueous binder, the amount of gas generated from the electrode during first time charge and discharge increases than that using an organic binder. If the amount of the generated gas increases, there is a concern that it has influence on the battery properties, and particularly the battery capacity may decrease when the battery is used over a long period of time.

SUMMARY

Accordingly, an object of the present invention is to provide a non-aqueous electrolyte secondary battery which can efficiently discharge the gas generated to the outside of the electrode and exhibits a low decrease in battery capacity even when used for a long period of time in the case of using an aqueous binder as the binder of the negative electrode active material layer.

The non-aqueous electrolyte secondary battery according to the present invention includes a positive electrode in which a positive electrode active material layer is formed on a surface of a positive electrode current collector, a negative electrode in which a negative electrode active material layer containing an aqueous binder is formed on a surface of a negative electrode current collector, and a separator that is disposed between the positive electrode active material layer and the negative electrode active material layer. In addition, the non-aqueous electrolyte secondary battery is characterized in that the density of the negative electrode active material layer is from 1.3 to 1.6 $g/cm^3$ and the center line average roughness (Ra) of the negative electrode active material layer is from 0.5 to 1.0 μm.

DETAILED DESCRIPTION OF THE EMBODIMENTS

The present invention is a non-aqueous electrolyte secondary battery which has a power generating element including a positive electrode in which a positive electrode active material layer is formed on a surface of a positive electrode current collector, a negative electrode in which a negative electrode active material layer is formed on a surface of a negative electrode current collector, and a separator, and in the non-aqueous electrolyte secondary battery, the density of the negative electrode active material layer is from 1.3 to 1.6 $g/cm^3$, the negative electrode active material layer contains an aqueous binder, and the surface center line average roughness (Ra) of a surface on a separator side of the negative electrode active material layer is from 0.5 to 1.0 μm.

As described above, an aqueous binder has various advantages since water can be used as a solvent in production of an active material layer, and also has high binding property for binding an active material. However, the inventors found that when an aqueous binder is used in a negative electrode active material layer, there is a problem that the amount of gas generated during first time charge and discharge is large in comparison to a negative electrode using an organic solvent-based binder. It is believed that this is because water, which is a solvent used in dissolving (dispersing) the aqueous binder, remains in the electrode, and this water is decomposed and becomes gas, and thus generation of gas increases more than an organic solvent-based binder. Due to such gas generation, when an aqueous binder is used in a negative electrode active material layer, the discharge capacity of a battery decreases when the battery is used over a long period of time in comparison to initial discharge capacity of the battery. It is believed that this is because gas remains on the active material layer by generation of gas, and formation of an SEI film on the surface of the negative electrode becomes uneven.

In a stack type laminate battery of which the capacity per single cell is several to several tens of times larger than that of consumer use, the electrode is large-sized for improvement of the energy density, and thus the amount of generated gas further increases, and uneven reaction on the negative electrode further easily occurs as well.

As a result of extensive investigations based on the above findings, the configuration of the present invention has been completed on the basis of an approach that the gas generated may be able to be efficiently discharged to the outside of the system if a passage for gas is constructed in the negative electrode active material layer and a mechanism that the gas passed through the active material layer is discharged to the outside of the power generating element is fabricated. In the present invention, the density of the negative electrode active material layer and the surface roughness of the negative electrode are within specified ranges. It is considered that the passage for the gas generated is constructed by appropriately controlling the density of the negative electrode active material layer and further the gas passed through the passage for gas in the power generating element is discharged from the surface of the negative electrode to the outside of the system by controlling the surface roughness of the negative electrode active material layer. In other words, the configuration of the present invention is that the gas generated is smoothly discharged to the outside of the system by properly fabricating a passage for gas in the electrode vertical direction and a passage for gas in the electrode surface direction and thus the battery performance is improved.

Consequently, according to the present invention, it is possible to obtain a non-aqueous electrolyte secondary battery exhibiting a low decrease in battery capacity even when used for a long period of time since the gas generated is easily discharged to the outside of the electrode even in the case of using an aqueous binder as the binder of the negative electrode active material layer.

Next, a description will be made of a non-aqueous electrolyte lithium ion secondary battery as a preferred embodiment of the non-aqueous electrolyte secondary battery, but it is not limited thereto. Meanwhile, the same elements are given with the same symbols for the descriptions of the drawings, and overlapped descriptions are omitted. Further, note that dimensional ratios in the drawings are exaggerated for the description, and are different from actual ratios in some cases.

Figure 1:
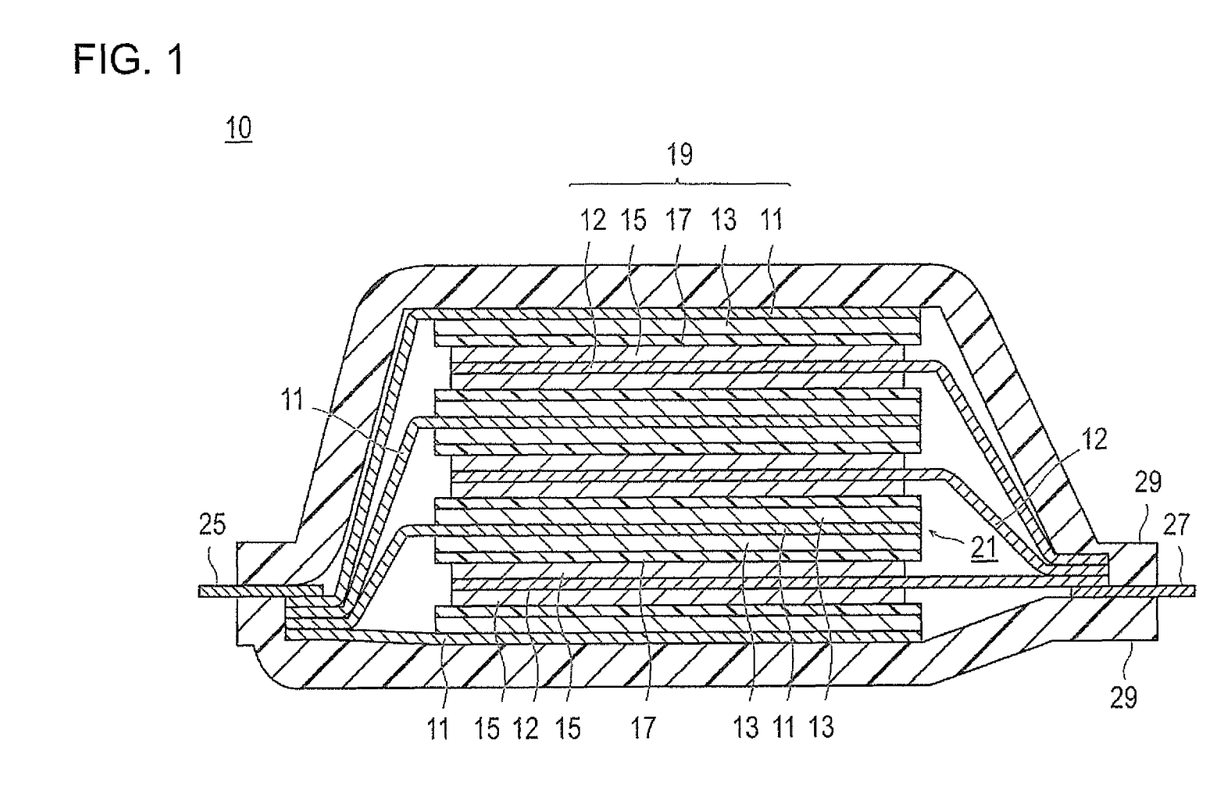
FIG. 1 is a cross-sectional view schematically illustrating the basic configuration of a non-aqueous electrolyte lithium ion secondary battery that is an embodiment of the non-aqueous electrolyte secondary battery and is not a bipolar type of flat type (stack type)

FIG. 1 is a cross-sectional view schematically illustrating the basic constitution of a non-aqueous electrolyte lithium ion secondary battery which is a flat type (stack type) and not a bipolar type (hereinbelow, it is also simply referred to as a "stack type battery"). As illustrated in FIG. 1, the stack type battery 10 according to this embodiment has a structure in which a power generating element 21 with a substantially rectangular shape, in which a charge and discharge reaction actually occurs, is sealed inside of a battery outer casing 29. Herein, the power generating element 21 has a constitution in which a positive electrode, the separator 17, and a negative electrode are stacked. Meanwhile, the separator 17 has a non-aqueous electrolyte (for example, liquid electrolyte) therein. The positive electrode has a structure in which the positive electrode active material layer 13 is disposed on both surfaces of the positive electrode current collector 11. The negative electrode has a structure in which the negative electrode active material layer 15 is disposed on both surfaces of the negative electrode current collector 12. Specifically, one positive electrode active material layer 13 and the neighboring negative electrode active material layer 15 are disposed to face each other via the separator 17, and the negative electrode, the electrolyte layer, and the positive electrode are stacked in this order. Accordingly, the neighboring positive electrode, electrolyte layer and negative electrode form one single battery layer 19. It can be also said that, as plural single barrier layers 19 are stacked, the stack type battery 10 illustrated in FIG. 1 has a constitution in which electrically parallel connection is made among them.

Meanwhile, on the outermost layer positive electrode current collector which is present on both outermost layers of the power generating element 21, the positive electrode active material layer 13 is disposed only on a single surface. However, an active material layer may be formed on both surfaces. Namely, not only a current collector exclusive for an outermost layer in which an active material layer is formed on a single surface can be achieved but also a current collector having an active material layer on both surfaces can be directly used as a current collector of an outermost layer. Furthermore, by reversing the arrangement of the positive electrode and negative electrode of FIG. 1, it is also possible that the outer most layer negative electrode current collector is disposed on both outermost layers of the power generating element 21 and a negative electrode active material layer is disposed on a single surface or both surfaces of the same outermost layer negative electrode current collector.

The positive electrode current collector 11 and negative electrode current collector 12 have a structure in which each of the positive electrode current collecting plate (tab) 25 and negative electrode current collecting plate (tab) 27, which conductively communicate with each electrode (positive electrode and negative electrode), is attached and inserted to the end part of the battery outer casing 29 so as to be led to the outside of the battery outer casing 29. If necessary, each of the positive electrode current collecting plate 25 and negative electrode current collecting plate 27 can be attached, via a positive electrode lead and negative electrode lead (not illustrated), to the positive electrode current collector 11 and negative electrode current collector 12 of each electrode by ultrasonic welding or resistance welding.

Meanwhile, although a stack type battery which is a flat type (stack type), not a bipolar type is illustrated in FIG. 1, it can be also a bipolar type battery containing a bipolar type electrode which has a positive electrode active material layer electrically bound to one surface of a current collector and a negative electrode active material layer electrically bound to the opposite surface of the current collector. In that case, one current collector plays both roles of a positive electrode current collector and a negative electrode current collector.

Hereinbelow, each member is described in more detail.

[Negative Electrode Active Material Layer]

In the present invention, the density of the negative electrode active material layer is from 1.3 to 1.6 g/cm$^3$. When the density of the negative electrode active material layer exceeds 1.6 g/cm$^3$, the density of the active material layer is high and thus the gas generated does not escape from the inside of the electrode and the long-term cycle characteristics decrease. In addition, when the density of the negative electrode active material layer is less than 1.3 g/cm$^3$, the communicating property of the active material decreases and the electron conductivity decreases and thus the battery performance decreases. The density of the negative electrode active material layer is preferably from 1.3 to 1.55 g/cm$^3$ from the viewpoint that the effect of the present invention is further exerted. The density of the negative electrode active material layer can be controlled within the above range by appropriately adjusting the pressing pressure at the time of producing the electrode. Incidentally, the density of the negative electrode active material layer represents the mass of the active material layer per unit volume. Specifically, the density can be determined by taking out the negative electrode active material layer from the battery, removing the solvent and the like present in the electrolytic solution and the like, then determining the volume of the electrode from the long side, short side, and height thereof, measuring the weight of the active material layer, and then dividing the weight by the volume.

In addition, in the present invention, the surface center line average roughness (Ra) of the surface on the separator side of the negative electrode active material layer is from 0.5 to 1.0 μm. The long-term cycle characteristics decrease when the center line average roughness (Ra) of the negative electrode active material layer is less than 0.5 μm. It is considered that this is because the surface roughness is small and thus the gas generated in the power generating element is hardly discharged to the outside of the system. In addition, on the other hand, when the center line average roughness (Ra) of the negative electrode active material layer exceeds 1.0 μm, the electron conductivity in the battery element decreases, and thus the battery characteristics decrease.

Figure 3:
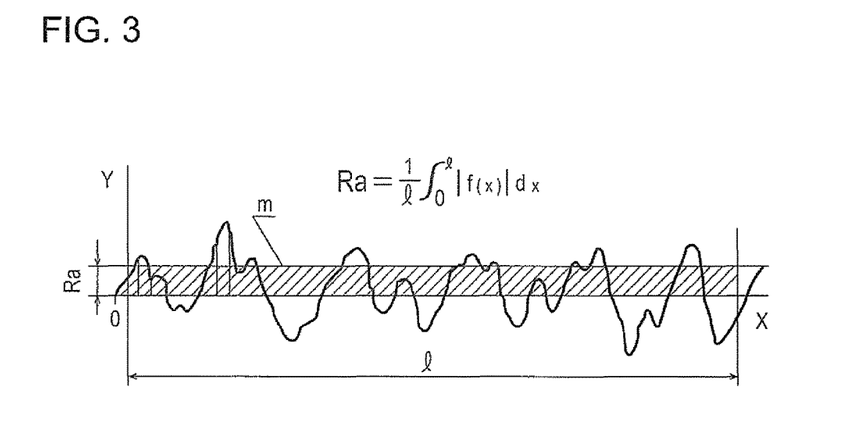
FIG. 3 is a graph illustrating Equation 1 defined in JIS B 0601-1994 and the surface roughness Ra determined by Equation 1.

As described herein, the average center line roughness Ra is a value expressed in micrometer (μm) which is obtained by the following Formula 1 (JIS-B0601-1994), when only the reference length in the direction of average line is subtracted from a roughness curve, x axis is taken in the direction of the average line in the subtracted part, y axis is taken in the direction of vertical magnification, and the roughness curve is expressed as y=f(x) (see FIG. 3).

$$Ra = \frac{1}{\ell}\int_0^\ell |f(x)|dx \qquad \text{[Formula 1]}$$

The value of Ra is measured by the method prescribed, for example, in JIS-B0601-1994 using a stylus type or a non-contact type surface roughness meter that is generally widely used. The manufacturer or model of the device is not limited at all. In the investigation of the present invention, the Ra was determined using model number: LEXT-OLS3000 manufactured by OLYMPUS CORPORATION by a roughness analyzer (analysis software supplied with the equipment) in conformity with the method prescribed in JIS-B0601. In the investigation of the present invention, the Ra was measured by a contact method although it is measurable by either of a contact method (stylus type using a diamond needle and the like) or a non-contact method (non-contact detection by laser light or the like).

In addition, as it is described in the method of Example, this surface roughness Ra regulated in the present invention is measured in the stage in which the active material layer is formed on the current collector in the production process since it can be relatively easily measured. However, the surface roughness is measurable even after the battery is completed and the result is almost the same as that measured in the production stage, and thus it is enough as long as the surface roughness after the completion of the battery satisfies the above range of Ra. In addition, the surface roughness of the negative electrode active material layer is the surface roughness on the separator side of the negative electrode active material layer.

The surface roughness of the negative electrode can be adjusted to the above range by, for example, adjusting the pressing pressure at the time of formation of the active material layer in consideration of the shape and particle size of the active material and the blending amount of the active material contained in the negative electrode active material layer, and the like. With regard to the shape of the active material, the shape that can be taken is different depending on the kind or the production method of the active material, and the shape can be controlled by grinding or the like, and examples of the shape may include a spherical (powder) shape, a plate shape, a needle-like shape, a columnar shape, and a horn shape. Hence, active materials having various shapes may be combined in order to adjust the surface roughness in consideration of the shape used in the active material layer.

The negative electrode active material layer contains a negative electrode active material. Examples of the negative electrode active material include a carbon material such as graphite, soft carbon, and hard carbon, a lithium-transition metal composite oxide (for example, $Li_4Ti_5O_{12}$), a metal material, and a lithium alloy-based negative electrode material. If necessary, two or more kinds of a negative electrode active material may be used in combination. Preferably, from the viewpoint of capacity and output characteristics, a carbon material or a lithium-transition metal composite oxide is used as a negative electrode active material. Meanwhile, it is needless to say that a negative electrode active material other than those described above can be also used.

The average particle size of each active material contained in the negative electrode active material layer is, although not particularly limited, preferably 1 to 100 μm, and more preferably 1 to 30 μm from the viewpoint of having high output.

The negative electrode active material layer includes at least an aqueous binder. The aqueous binder has an advantage of lowering a burden on environment and greatly suppressing an investment on facilities of a production line, since water as a raw material is conveniently available and only water vapor is generated during drying.

The aqueous binder indicates a binder with which water is used as a solvent or a dispersion medium, and specific examples thereof include a thermoplastic resin, a polymer with rubber elasticity, a water soluble polymer, and a mixture thereof. Herein, the binder with which water is used as a dispersion medium includes all expressed as latex or an emulsion, and it indicates a polymer emulsified in water or suspended in water. Examples thereof include a polymer latex obtained by emulsion polymerization in a self-emulsifying system.

Specific examples of the aqueous binder include a styrene polymer (styrene-butadiene rubber, styrene-vinyl acetic acid copolymer, styrene-acryl copolymer or the like), acrylonitrile-butadiene rubber, methacrylic acid methyl-butadiene rubber, (meth)acrylic polymer (polyethylacrylate, polyethylmethacrylate, polypropylacrylate, polymethylmethacrylate (methacrylic acid methyl rubber), polypropylmethacrylate, polyisopropylacrylate, polyisopropylmethacrylate, polybutylacrylate, polybutylmethacrylate, polyhexylacrylate, polyhexylmethacrylate, polyethylhexylacrylate, polyethylhexylmethacrylate, polylaurylacrylate, polylaurylmethacrylate, or the like), polytetrafluoroethylene, polyethylene, polypropylene, ethylene-propylene copolymer, polybutadiene, butyl rubber, fluororubber, polyethylene oxide, polyepichlorohydrin, polyphosphagen, polyacrylonitrile, polystyrene, ethylene-propylene-diene copolymer, polyvinylpyridine, chlorosulfonated polyethylene, a polyester resin, a phenol resin, an epoxy resin; polyvinyl alcohol (average polymerization degree is preferably 200 to 4,000, and more preferably 1,000 to 3,000, and saponification degree is preferably 80% by mol or more, and more preferably 90% by mol or more) and a modified product thereof (1 to 80% by mol saponified product in a vinyl acetate unit of a copolymer with ethylene/vinyl acetate=2/98 to 30/70 (molar ratio), 1 to 50% by mol partially acetalized product of polyvinyl alcohol, or the like), starch, and a modified product (oxidized starch, phosphoric acid esterified starch, cationized starch, or the like), cellulose derivatives (carboxymethyl cellulose, methyl cellulose, hydroxypropyl cellulose, hydroxyethyl cellulose, and a salt thereof), polyvinylpyrrolidone, polyacrylic acid (salt), polyethylene gylcol, copolymer of (meth)acrylamide and/or (meth)acrylic acid salt [(meth)acrylamide polymer, (meth)acrylamide-(meth)acrylic acid salt copolymer, alkyl (meth) acrylic acid (carbon atom number of 1 to 4) ester-(meth) acrylic acid salt copolymer, or the like], styrene-maleic acid salt copolymer, mannich modified product of polyacrylamide, formalin condensation type resin (urea-formalin resin, melamin-formalin resin or the like), polyamidepolyamine or dialkylamine-epichlorohydrin copolymer, polyethyleneimine, casein, soybean protein, synthetic protein, and a water soluble polymer such as mannan galactan derivatives. The aqueous binder can be used either singly or in combination of two or more types.

From the viewpoint of a binding property, the aqueous binder preferably contains at least one rubber-based binder which is selected from the group consisting of styrene-butadiene rubber, acrylonitrile-butadiene rubber, methacrylic acid methyl-butadiene rubber, and methacrylic acid methyl rubber. Furthermore, it is preferable that the aqueous binder contains a styrene-butadiene rubber since the binding property is favorable.

When styrene-butadiene rubber is used as an aqueous binder, the aforementioned water soluble polymer is preferably used in combination from the viewpoint of improving the coating property. Examples of the water soluble polymer which is preferably used in combination with styrene-butadiene rubber include polyvinyl alcohol and a modified product thereof, starch and a modified product thereof, cellulose derivatives (carboxymethyl cellulose, methyl cellulose, hydroxyethyl cellulose, and a salt thereof), polyvinylpyrrolidone, polyacrylic acid (salt), and polyethylene glycol. Among them, styrene-butadiene rubber and carboxymethyl cellulose are preferably combined as a binder. The content mass ratio of the styrene-butadiene rubber to the water-soluble polymer is not particularly limited, and preferably as follows: styrene-butadiene rubber:water soluble polymer=1:0.1 to 10, and more preferably 1:0.5 to 2.

In the binder used for the negative electrode active material layer, content of the aqueous binder is preferably 80 to 100% by mass, more preferably 90 to 100% by mass, and even more preferably 100% by mass. As a binder other than an aqueous binder, a binder used in the following positive electrode active material layer can be mentioned.

The amount of the binder contained in the negative electrode active material layer is not particularly limited as long as it is an amount in which the active material can be bound, and the amount is preferably from 0.5 to 15% by mass, more preferably 1 to 10% by mass, and even more preferably from 2 to 4% by mass with respect to the active material layer. The active material layer can be formed by adding a smaller amount of the aqueous binder as compared with an organic solvent-based binder since the aqueous binder exhibits a high binding force. For this reason, the content of the aqueous binder in the active material layer is preferably from 0.5 to 15% by mass, more preferably 1 to 10% by mass, and even more preferably from 2 to 4% by mass with respect to the active material layer.

If necessary, the negative electrode active material layer further contains other additives such as a conductive aid, an electrolyte (for example, polymer matrix, ion conductive polymer, and electrolytic solution), and lithium salt for enhancing ion conductivity.

The conductive aid means an additive which is blended in order to enhance the conductivity of the positive electrode active material layer or negative electrode active material layer. As the conductive aid, for example, there can be mentioned carbon black including acetylene black; graphite; and carbon materials such as carbon fiber. When the active material layer contains a conductive aid, an electron network is formed effectively in the inside of the active material layer, and it can contribute to improvement of the output characteristics of a battery.

Examples of the electrolyte salt (lithium salt) include $Li(C_2F_5SO_2)_2N$, $LiPF_6$, $LiBF_4$, $LiClO_4$, $LiAsF_6$, and $LiCF_3SO_3$.

Examples of the ion conductive polymer include polyethylene oxide (PEO)-based and polypropylene oxide (PPO)-based polymer.

A blending ratio of the components that are contained in the negative electrode active material layer and positive electrode active material layer described below is not particularly limited. The blending ratio can be adjusted by suitably referring the already-known knowledge about a lithium ion secondary battery. The thickness of each active material layer is not particularly limited either, and reference can be made to the already-known knowledge about a battery. For example, the thickness of each active material layer is about 2 to 100 µm.

[Positive Electrode Active Material Layer]

The positive electrode active material layer contains an active material, and if necessary, it further contains other additives such as a conductive aid, a binder, an electrolyte (for example, polymer matrix, ion conductive polymer, and electrolyte liquid), and lithium salt for enhancing ion conductivity.

The positive electrode active material layer contains a positive electrode active material. Examples of the positive electrode active material include a lithium-transition metal composite oxide such as $LiMn_2O_4$, $LiCoO_2$, $LiNiO_2$, $Li(Ni-Mn-Co)O_2$, or a compound in which part of the transition metals is replaced with other element, a lithium-transition metal phosphate compound, and a lithium-transition metal sulfate compound. Depending on the case, two or more kinds of a positive electrode active material can be used in combination. As a preferred example, a lithium-transition metal composite oxide is used as a positive electrode active material from the viewpoint of capacity and output characteristics. As a more preferred example, $Li(Ni-Mn-Co)O_2$ and a compound in which part of the transition metals is replaced with other element (hereinbelow, also simply referred to as the "NMC composite oxide") are used. The NMC composite oxide has a layered crystal structure in which a lithium atom layer and a transition metal (Mn, Ni, and Co are arranged with regularity) atom layer are alternately stacked via an oxygen atom layer, one Li atom is included per atom of transition metal M and extractable Li amount is twice the amount of spinel lithium manganese oxide, that is, as the supply power is two times higher, it can have high capacity.

As described above, the NMC composite oxide includes a composite oxide in which part of transition metal elements are replaced with other metal element. In that case, examples of other element include Ti, Zr, Nb, W, P, Al, Mg, V, Ca, Sr, Cr, Fe, B, Ga, In, Si, Mo, Y, Sn, V, Cu, Ag, and Zn. Preferably, it is Ti, Zr, Nb, W, P, Al, Mg, V, Ca, Sr, or Cr. More preferably, it is Ti, Zr, P, Al, Mg, or Cr. From the viewpoint of improving the cycle characteristics, it is even more preferably Ti, Zr, Al, Mg, or Cr.

By having high theoretical discharge capacity, the NMC composite oxide preferably has a composition represented by General Formula (1): $Li_aNi_bMn_cCo_dM_xO_2$ (with the proviso that, in the formula, a, b, c, d, and x satisfy $0.9 \leq a \leq 1.2$, $0 < b < 1$, $0 < c \leq 0.5$, $0 < d \leq 0.5$, $0 \leq x \leq 0.3$, and $b+c+d=1$. M represents at least one element selected from Ti, Zr, Nb, W, P, Al, Mg, V, Ca, Sr, and Cr). Herein, a represents the atomic ratio of Li, b represents the atomic ratio of Ni, c represents the atomic ratio of Mn, d represents the atomic ratio of Co, and x represents the atomic ratio of M. From the viewpoint of the cycle characteristics, it is preferable that $0.4 \leq b \leq 0.6$ in General Formula (1). Meanwhile, composition of each element can be measured by induction coupled plasma (ICP) spectroscopy.

In general, from the viewpoint of improving purity and improving electron conductivity of a material, nickel (Ni), cobalt (Co) and manganese (Mn) are known to contribute to capacity and output characteristics. Ti or the like replaces part of transition metal in a crystal lattice. From the viewpoint of the cycle characteristics, it is preferable that part of transition element are replaced by other metal element, and it is preferable that $0 < x \leq 0.3$ in General Formula (1), in particular. By dissolving at least one selected from the group consisting of Ti, Zr, Nb, W, P, Al, Mg, V, Ca, Sr and Cr, the crystal structure is stabilized so that a decrease in capacity of a battery is prevented even after repeated charge and discharge, and thus, it is believed that excellent cycle characteristics can be achieved.

As a more preferred embodiment, b, c, and d in General Formula (1) satisfy $0.44 \leq b \leq 0.51$, $0.27 \leq c \leq 0.31$, and $0.19 \leq d \leq 0.26$ from the viewpoint of improving balance between capacity and life-time property. Meanwhile, it is needless to say that a positive electrode active material other than those described above can be also used.

The average particle size of each active material which is contained in the positive electrode active material layer is, although not particularly limited, preferably 1 to 100 and more preferably 1 to 20 μm from the viewpoint of having high output.

A binder used for the positive electrode active material layer is not particularly limited and the following materials can be mentioned; thermoplastic polymers such as polyethylene, polypropylene, polyethylene terephthalate (PET), polyether nitrile, polyacrylonitrile, polyimide, polyamide, cellulose, carboxymethyl cellulose (CMC) and a salt thereof, an ethylene-vinyl acetate copolymer, polyvinyl chloride, styrene-butadiene rubber (SBR), isoprene rubber, butadiene rubber, ethylene-propylene rubber, an ethylene-propylene-diene copolymer, a styrene-butadiene-styrene block copolymer and a hydrogenated product thereof, and a styrene-isoprene-styrene block copolymer and a hydrogenated product thereof, fluorine resins such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF), vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TEF-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFT-TFE-based fluorine rubber), vinylidene fluoride-perfluoromethyl vinyl ether-tetrafluoroethylene-based fluorine rubber (VDF-PFMVE-TFE-based fluorine rubber), and vinylidene fluoride-chlorotrifluoroethylene fluorine-based fluorine rubber (VDF-CTFE-based fluorine rubber), an epoxy resin, and the like. These binders may be each used singly, or two or more thereof may be used in combination.

The amount of the binder contained in the positive electrode active material layer is not particularly limited as long as it is an amount in which the active material can be bound, and the amount is preferably from 0.5 to 15% by mass and more preferably 1 to 10% by mass with respect to the active material layer.

With regard to other additives other than the binder, those described for the above negative electrode active material layer can be also used.

[Separator (Electrolyte Layer)]

A separator has an activity of maintaining an electrolyte to ensure lithium ion conductivity between a positive electrode and a negative electrode and also a function of a partition wall between a positive electrode and negative electrode.

In the present invention, the release of gas generated is improved by controlling the density of the negative electrode active material layer and the surface roughness of the surface of the negative electrode active material layer, but it is also required to consider the discharge of the gas that has escaped the negative electrode active material layer and reached the separator in order to further improve the discharge of gas. From such a viewpoint, it is more preferable that the air permeability and porosity of the separator are in appropriate ranges.

Specifically, the air permeability (Gurley value) of the separator is preferably 200 (unit second/100 cc) or less. As the air permeability (Gurley value) of the separator is preferably 200 (unit second/100 cc) or less, the release of the generated gas at first charge is improved so that the battery can have good capacity retention rate after cycles and can have sufficient short-circuit preventing property and also sufficient mechanical properties as a function of the separator. Although the lower limit of the air permeability is not particularly limited, it is generally 100 (unit second/100 cc) or more. The air permeability of the separator is a value measured by the method of JIS P8117 (2009).

Furthermore, the porosity of the separator is preferably 40 to 65%. As the porosity of the separator is 40 to 65%, the release of the gas generated at first charge is improved, the battery has good capacity retention rate after cycles, and also the battery can have sufficient short-circuit preventing property and sufficient mechanical properties as a function of the separator. Meanwhile, as for the porosity, a value obtained as a volume ratio from the density of a raw material resin of a separator and the density of a separator as a final product is used. For example, when the density of a raw material resin is ρ and volume density of a separator is ρ', it is described as follows: porosity=100×(1−ρ'/ρ).

Examples of a separator shape include a porous sheet separator or a non-woven separator composed of a polymer or a fiber which absorbs and maintains the electrolyte.

As a porous sheet separator composed of a polymer or a fiber, a microporous (microporous membrane) separator can be used, for example. Specific examples of the porous sheet composed of a polymer or a fiber include a microporous (microporous membrane) separator which is composed of polyolefin such as polyethylene (PE) and polypropylene (PP); a laminate in which plural of them are laminated (for example, a laminate with three-layer structure of PP/PE/PP), and a hydrocarbon based resin such as polyimide, aramid, or polyfluorovinylydene-hexafluoropropylene (PVdF-HFP), or glass fiber.

The thickness of the microporous (microporous membrane) separator cannot be uniformly defined as it varies depending on use of application. For example, for an application in a secondary battery for operating a motor of an electric vehicle (EV), a hybrid electric vehicle (HEV), and a fuel cell vehicle (FCV), it is preferably 4 to 60 μm as a monolayer or a multilayer. Fine pore diameter of the microporous (microporous membrane) separator is preferably 1 μm or less at most (in general, the pore diameter is about several tens of nanometer).

As a non-woven separator, conventionally known ones such as cotton, rayon, acetate, nylon, polyester; polyolefin such as PP and PE; polyimide and aramid are used either singly or as a mixture. In addition, the volume density of a non-woven fabric is not particularly limited as long as sufficient battery characteristics are obtained with an impregnated polymer gel electrolyte. Furthermore, the thickness of the nonwoven fabric separator may be the same as the electrolyte layer, and it is preferably from 5 to 200 μm and even more preferably from 10 to 100 μm.

In addition, the separator may be a separator fabricated by laminating a heat-resistant insulating layer on a porous substrate. The Heat-resistant insulating layer is a ceramic layer containing inorganic particles and a binder. The internal stress of the separator which increases when the temperature increases is relaxed as a heat-resistant insulating layer is included, and thus a heat-shrinkage inhibiting effect can be obtained. In addition, the mechanical strength of the separator with heat-resistant insulating layer is improved by including a heat-resistant insulating layer, and thus the membrane of the separator is hardly broken. Furthermore, the separator is less likely to curl in the production process of the non-aqueous electrolyte secondary battery since the separator has a high heat-shrinkage inhibiting effect and a high mechanical strength.

As described above, the separator also contains an electrolyte. The electrolyte is not particularly limited as long as it can exhibit those functions, and a liquid electrolyte or a gel polymer electrolyte is used.

The liquid electrolyte has an activity of a lithium ion carrier. The liquid electrolyte has the form in which lithium salt as a supporting electrolyte is dissolved in an organic solvent as a plasticizing agent. Examples of the organic solvent which can be used include carbonates such as ethylene carbonate (EC), propylene carbonate (PC), dimethyl carbonate (DMC), diethyl carbonate (DEC), and ethylmethyl carbonate. Furthermore, as a lithium salt, the compound which can be added to an active material layer of an electrode such as $Li(CF_3SO_2)_2N$, $Li(C_2F_5SO_2)_2N$, $LiPF_6$, $LiBF_4$, $LiClO_4$, $LiAsF_6$, $LiTaF_6$, and $LiCF_3SO_3$ can be similarly used. The liquid electrolyte may further contain an additive in addition to the components that are described above. Specific examples of the compound include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, allylethylene carbonate, vinyloxymethylethylene carbonate, allyloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methylene ethylene carbonate, and 1,1-dimethyl-2-methyleneethylene carbonate. Among them, vinylene carbonate, methylvinylene carbonate, and vinylethylene carbonate are preferable. Vinylene carbonate and vinylethylene carbonate are more preferable. Those cyclic carbonate esters may be used either singly or in combination of two or more types.

The gel polymer electrolyte has a constitution that the aforementioned liquid electrolyte is injected to a matrix polymer (host polymer) consisting of an ion conductive polymer. Using a gel polymer electrolyte as an electrolyte is excellent in that the fluidity of an electrolyte disappears and ion conductivity between each layer is blocked. Examples of an ion conductive polymer which is used as a matrix polymer (host polymer) include polyethylene oxide (PEO), polypropylene oxide (PPO), and a copolymer thereof. An electrolyte salt such as lithium salt can be dissolved well in those polyalkylene oxide polymers.

According to forming of a cross-linked structure, the matrix polymer of a gel electrolyte or a true polymer electrolyte can exhibit excellent mechanical strength. For forming a cross-linked structure, it is sufficient to perform a polymerization treatment of a polymerizable polymer for forming a polymer electrolyte (for example, PEO and PPO), such as thermal polymerization, UV polymerization, radiation polymerization, and electron beam polymerization, by using a suitable polymerization initiator.

[Current Collector]

The material for forming a current collector is not particularly limited, but metal is preferably used.

Specific examples of the metal include aluminum, nickel, iron, stainless, titan, copper, and other alloys. In addition to them, a clad material of a nickel and aluminum, a clad material of copper and aluminum, or a plating material of a combination of those metals can be preferably used. It can be also a foil obtained by coating aluminum on a metal surface. Among them, from the viewpoint of electron conductivity or potential for operating a battery, aluminum, stainless, and copper are preferable.

The size of the current collector is determined based on use of a battery. When it is used for a large-size battery which requires high energy density, for example, a current collector with large area is used. The thickness of the current collector is not particularly limited, either. The thickness of the current collector is generally about 1 to 100 μm.

[Positive Electrode Current Collecting Plate and Negative Electrode Current Collecting Plate]

The material for forming the current collecting plate (25, 27) is not particularly limited, and a known highly conductive material which has been conventionally used for a current collecting plate for a lithium ion secondary battery can be used. Preferred examples of the material for forming a current collecting plate include metal material such as aluminum, copper, titanium, nickel, stainless steel (SUS) and an alloy thereof. From the viewpoint of light weightiness, resistance to corrosion, and high conductivity, aluminum and copper are preferable. Aluminum is particularly preferable. Meanwhile, the same material or a different material can be used for the positive electrode current collecting plate 25 and the negative electrode current collecting plate 27.

[Positive Electrode Lead and Negative Electrode Lead]

Further, although it is not illustrated, the current collector 11 and the current collecting plate (25, 27) can be electrically connected to each other via a positive electrode lead or a negative electrode lead. The same material used for a lithium ion secondary battery of a related art can be also used as a material for forming a positive electrode lead and a negative electrode lead. Meanwhile, a portion led out from a casing is preferably coated with a heat resistant and insulating thermally shrunken tube or the like so that it has no influence on a product (for example, an automobile component, in particular, an electronic device or the like) by electric leak after contact with neighboring instruments or wirings.

[Battery Outer Casing]

As for the battery outer casing 29, an envelope-shaped casing which can cover a power generating element, and in which a laminate film including aluminum is contained, can be used in addition to a known metal can casing. As for the laminate film, a laminate film with a three-layer structure formed by laminating PP, aluminum and nylon in order can be used, but not limited thereto. From the viewpoint of having high output and excellent cooling performance, and of being suitably usable for a battery for a large instrument such as EV or HEV, a laminate film is preferable. Furthermore, as the group pressure applied from outside to a power generating element can be easily controlled, a laminate film containing aluminum is more preferred for an outer casing.

The internal volume of the outer casing is preferably larger than the volume of the power generating element. Herein, the internal volume of the outer casing indicates the volume in the outer casing before performing vacuum drawing after sealing with the outer casing. In addition, the volume of the power generating element is the volume of the portion spatially occupied by the power generating element, and contains cavities in the power generating element. With the internal volume of the outer casing larger than the volume of the power generating element, volume is present that can store gas when the gas is generated. Hence, the gas is smoothly discharged to the outside of the system, the gas generated is less likely to affect the battery behavior, and thus battery characteristics are improved. In addition, a surplus part that is capable of storing the gas in the outer casing in a case where gas is generated is present so that the volume of the power generating element is kept constant, and thus it is possible to maintain a fixed distance between the electrodes and a uniform reaction. It is preferable that the internal volume of the outer casing is great to some extent so as to be able to store the gas, and specifically, it is preferable that the internal volume of the outer casing is greater than the volume of the power generating element by from 0.03 to 0.12 volume fraction of the volume of the power generating element excluding the pore portion.

A large-size battery is required recently for use in an automobile and the like. In addition, the effect of the invention, that is, effective discharge of generated gas to the exterior, can be more effectively exhibited in a large-area battery having a large amount of gas generation. Thus, in the invention, a battery structure in which a power generating element is covered with an outer casing preferably has a large size in a sense of further exhibiting the effect of the invention. Specifically, the negative electrode active material layer preferably has a rectangular shape, and the length of the short side of the rectangular shape is 100 mm or more. Such a large-size battery can be used for use in cars. The upper limit of the length of the short side of the rectangular shape is not particularly limited, but usually 250 mm or less.

It is also possible to determine the large size of a battery based on a relationship between battery area and battery capacity, as the viewpoint of a large-size battery, which is different from a physical size of an electrode. For example, in the case of a flat and stack type laminate battery, the ratio value of a battery area to rated capacity (the maximum value of projected area of a battery including an outer casing of a battery) is 5 $cm^2$/Ah or more, and for a battery with rated capacity of 3 Ah or more, the battery area per unit capacity is large so that the gas generation amount is still large. Thus, a problem of a decrease in battery performance (particularly, life-time property after long-term cycle) in a battery in which an aqueous binder such as SBR is used in formation of the negative electrode active material layer, may occur more easily. Thus, the non-aqueous electrolyte secondary battery according to this embodiment is preferably a large-size battery as described above from the viewpoint of having a larger merit obtained from exhibition of the working effects of the present invention. Furthermore, the aspect ratio of a rectangular electrode is preferably 1 to 3, and more preferably 1 to 2. Meanwhile, the aspect ratio of an electrode is defined by longitudinal/transversal ratio of a positive electrode active material layer with rectangular shape. By having the aspect ratio in this range, advantages of allowing for gas discharge uniformly in the plane direction, and further suppressing uneven film generation, in the invention in which use of an aqueous binder is essential.

[Group Pressure Applied to Power Generating Element]

In the present invention, the group pressure applied to the power generating element is preferably from 0.07 to 0.7 $kgf/cm^2$ (6.86 to 68.6 kPa). The discharge of gas to the outside the system is improved and the excess electrolytic solution in the battery does not remain much between the electrodes by pressurizing the power generating element so as to have a group pressure of from 0.07 to 0.7 $kgf/cm^2$, and thus it is possible to suppress an increase in cell resistance. Furthermore, bulging of the battery is suppressed and thus the cell resistance and the capacity retention after a long-term cycle are favorable. The group pressure applied to the power generation element is more preferably from 0.1 to 0.7 $kgf/cm^2$ (9.80 to 68.6 kPa). Here, the group pressure refers to the external force applied to the power generating element, and the group pressure applied to the power generating element can be measured by a method in which a pressure-sensitive paper is interposed between the parts subjected to the pressure measurement, pressure is applied thereto, the pressure is then once removed, and the pressure applied to the pressure-sensitive paper is read.

Although it is not particularly limited, control of the group pressure can be made by applying directly or indirectly external force to a power generating element by physical means, and controlling the external force. As for the method for applying external force, it is preferable to use a pressure member which can apply pressure on an outer casing. Namely, one preferred embodiment of the present invention is a non-aqueous electrolyte secondary battery which further has a pressure member for applying pressure on an outer casing such that the group pressure applied on the power generating element is 0.07 to 0.7 kgf/cm$^2$.

Figure 2A:
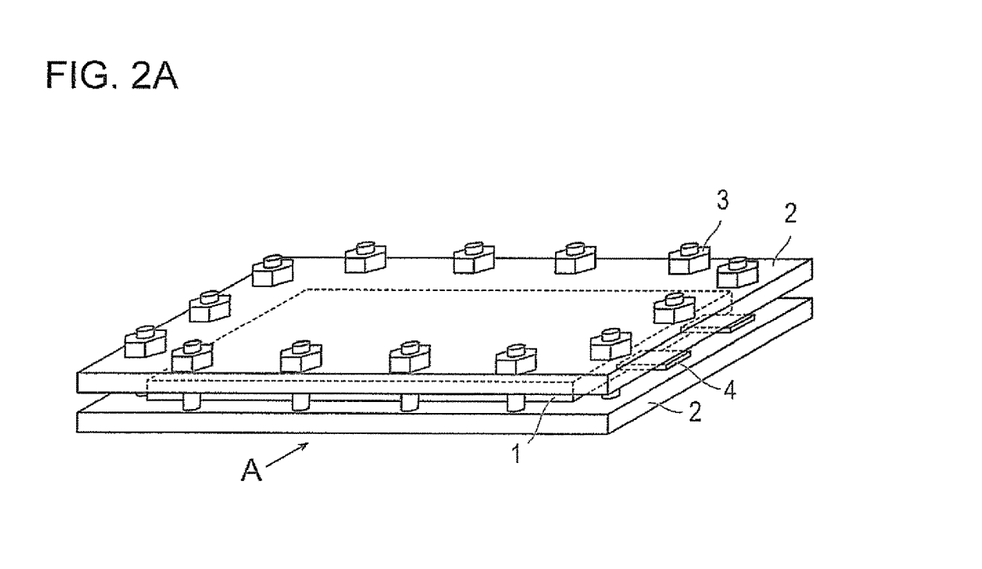
FIG. 2A is a schematic view of a non-aqueous electrolyte secondary battery which is one suitable embodiment of the invention.
Figure 2B:
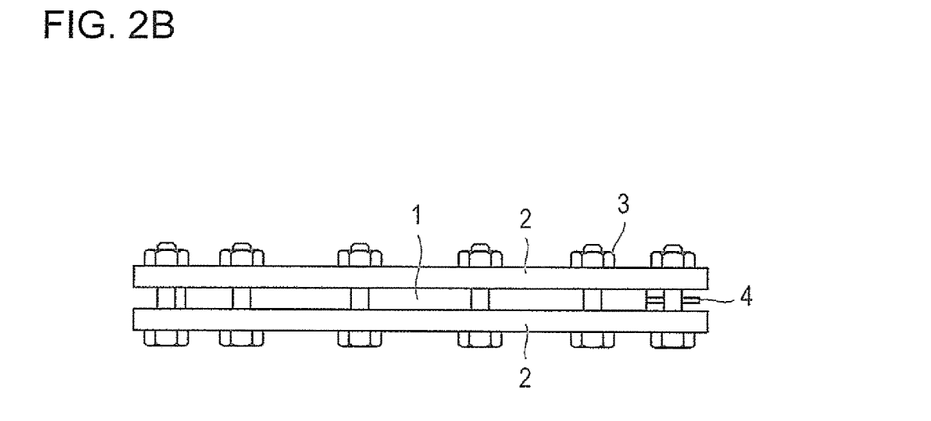
FIG. 2B is a figure viewing from the arrow direction of the direction A in FIG. 2A.

FIG. 2A is a schematic view of a non-aqueous electrolyte lithium ion secondary battery as another preferred embodiment of the present invention and FIG. 2B is a diagram seen from the arrow direction of A in FIG. 2A. The outer casing 1 with enclosed power generating element has a flat rectangular shape, and the electrode tab 4 is drawn from the lateral side of the outer casing for extracting electric power. The power generating element is covered by the battery outer casing with its periphery fused by heat. The power generating element is sealed in a state in which the electrode tab is led to the outside. Herein, the power generating element corresponds to the power generating element 21 of the lithium ion secondary battery 10 illustrated in FIG. 1 as described above. In FIG. 2, 2 represents a SUS plate as a pressure member, 3 represents a fixing jig as a fixing member, and 4 represents an electrode tab (negative electrode tab or positive electrode tab). The pressure member is disposed for the purpose of controlling the group pressure applied to power generating element to 0.07 to 0.7 kgf/cm$^2$. Examples of the pressure member include a rubber material such as urethane rubber sheet, a metal plate such as aluminum and SUS. Furthermore, from the viewpoint of having continuous application of constant pressure on a power generating element by a pressure member, it is preferable to have additionally a fixing means for fixing a pressure member. Furthermore, by controlling the fixing of a fixing jig onto a pressure member, the group pressure applied to a power generating element can be easily controlled.

Meanwhile, drawing of the tab illustrated in FIG. 2 is not particularly limited, either. The positive electrode tab and the negative electrode tab may be drawn from two lateral sides, or each of the positive electrode tab and negative electrode tab may be divided into plural tabs and drawn from each side, and thus it is not limited to the embodiment illustrated in FIG. 2.

[Assembled Battery]

An assembled battery is formed by connecting plural batteries. Specifically, at least two of them are used in series, in parallel, or in series and parallel. According to arrangement in series or parallel, it becomes possible to freely control the capacity and voltage.

It is also possible to form a detachable small-size assembled battery by connecting plural batteries in series or in parallel. Furthermore, by connecting again plural detachable small-size assembled batteries in series or parallel, an assembled battery having high capacity and high output, which is suitable for a power source for operating a vehicle requiring high volume energy density and high volume output density or an auxiliary power source, can be formed. The number of the connected batteries for fabricating an assembled battery or the number of the stacks of a small-size assembled battery for fabricating an assembled battery with high capacity can be determined depending on the capacity or output of a battery of a vehicle (electric vehicle) for which the battery is loaded.

[Vehicle]

The above described non-aqueous electrolyte secondary battery has excellent output characteristics and can maintain discharge capacity even when it is used for a long period of time, and thus has good cycle characteristics. For use in a vehicle such as an electric vehicle, a hybrid electric vehicle, a fuel cell electric vehicle, or a hybrid fuel cell electric vehicle, long service life is required as well as high capacity and large size compared to use for an electric and mobile electronic device. Thus, above described non-aqueous electrolyte secondary battery can be preferably used as a power source for a vehicle, for example, as a power source for operating a vehicle or as an auxiliary power source.

Specifically, the battery or an assembled battery formed by combining plural batteries can be mounted on a vehicle. According to the present invention, a battery with excellent long term reliability, output characteristics, and long service life can be formed, and thus, by mounting this battery, a plug-in hybrid electric vehicle with long EV driving distance and an electric vehicle with long driving distance per charge can be achieved. That is because, when the battery or an assembled battery formed by combining plural batteries is used for, for example, a vehicle such as hybrid car, fuel cell electric car, and electric car (including two-wheel vehicle (motor bike) or three-wheel vehicle in addition to all four-wheel vehicles (automobile, truck, commercial vehicle such as bus, compact car, or the like)), a vehicle with long service life and high reliability can be provided. However, the use is not limited to a vehicle, and it can be applied to various power sources of other transportation means, for example, a moving object such as an electric train, and it can be also used as a power source for loading such as an uninterruptable power source device.

EXAMPLE

Hereinafter, the present invention will be described in more detail with reference to Examples and Comparative Examples, but it is not only limited to the following Examples at all.

Example 1

1. Preparation of Electrolytic Solution

A mixed solvent (30:30:40 (volume ratio)) of ethylene carbonate (EC), ethylmethyl carbonate (EMC), and diethyl carbonate (DEC) was used as a solvent. In addition, 1.0 M LiPF$_6$ was used as the lithium salt. The electrolytic solution was prepared by adding vinylene carbonate at 2% by mass with respect to 100% by mass of the sum of the solvent and the lithium salt. Incidentally, the "1.0 M LiPF$_6$" means that the concentration of the lithium salt (LiPF$_6$) in the mixture of the mixed solvent and the lithium salt is 1.0 M.

2. Production of Positive Electrode

A solid matter composed of 85% by mass of LiMn$_2$O$_4$ (average particle size: 15 μm) as the positive electrode active material, 5% by mass of acetylene black as the conductive aid, and 10% by mass of PVdF as the binder was prepared. An appropriate amount of N-methyl-2-pyrrolidone (NMP) of a slurry viscosity adjusting solvent was added to this solid matter to prepare the positive electrode slurry. Next, the positive electrode slurry was coated on both surfaces of an aluminum foil (20 μm) as the current collector and then dried and pressed, thereby producing the positive electrode having a coating amount for one side of 18 mg/cm$^2$ and a thickness for both sides of 157 μm (including the foil).

3. Production of Negative Electrode

A solid matter composed of 95% by mass of artificial graphite (manufactured by Hitachi Chemical Co., Ltd., shape: flake graphite, average particle size: 20 μm) as the negative electrode active material, 2% by mass of acetylene black as the conductive aid, 2% by mass of SBR (manufactured by ZEON CORPORATION) as the binder, and 1% by mass of CMC (manufactured by NIPPON PAPER INDUSTRIES CO., LTD., trade name: SUN ROSE) was prepared.

An appropriate amount of ion exchanged water of a slurry viscosity adjusting solvent was added to this solid matter to prepare the negative electrode slurry. Next, the negative electrode slurry was coated on both surfaces of a copper foil (15 μm) as the current collector and then dried and pressed, thereby producing the negative electrode having a coating amount for one side of 5.1 mg/cm$^2$ and a thickness of 82 μm (including the foil).

The surface center line average roughness (Ra) of the negative electrode active material layer thus produced was measured using a contact-type surface roughness meter (manufactured by OLYMPUS CORPORATION, model number: LEXT-OLS3000).

4. Completing Process of Single Battery

The positive electrode produced above was cut into a rectangle (rectangular shape) of 210×184 mm, and the negative electrode was cut into a rectangle (rectangular shape) of 215×188 mm (15 sheets of positive electrode, 16 sheets of negative electrode). The positive electrode and the negative electrode were alternately laminated via the separator (microporous polyolefin membrane, thickness: 25 μm) of 219×191 mm to prepare a power generating element.

The tabs were welded to each of these positive electrodes and negative electrodes, the power generating element was enclosed in the outer casing formed of an aluminum laminate film together with the electrolytic solution to complete the battery, and the battery was interposed between a urethane rubber sheet (thickness: 3 mm) larger than the electrode area and further an Al plate (thickness: 5 mm) and pressurized so as to have a group pressure presented in Table 1, thereby completing the single battery.

The rated capacity of the battery thus produced was 14.6 Ah and the ratio of the battery area to the rated capacity was 34.8 cm$^2$/Ah. Incidentally, the rated capacity of the battery (single cell) was determined as follows.

The battery for test is left to stand for 10 hours after injecting the electrolytic solution and the initial charge thereof is conducted. Thereafter, the rated capacity thereof is measured at a temperature of 25° C. in a voltage range of from 3.0 V to 4.15 V by the following procedures 1 to 5.

Procedure 1: After the voltage reaches 4.15 V at constant current charge of 0.2 C, rest for 5 minutes.

Procedure 2: Following procedure 1, charge for 1.5 hours at constant voltage charge, and rest for 5 minutes.

Procedure 3: After the voltage reaches 3.0 V by constant current discharge of 0.2 C, discharge for 2 hours at constant voltage discharge, and then rest for 10 seconds.

Procedure 4: After the voltage reaches 4.1 V by constant current charge of 0.2 C, charge for 2.5 hours at constant voltage charge, and then rest for 10 seconds.

Procedure 5: After the voltage reaches 3.0 V by constant current discharge of 0.2 C, discharge for 2 hours at constant voltage discharge, and then stop for 10 seconds.

Rated capacity: Discharge capacity in discharge from constant current discharge to constant voltage discharge (CCCV discharge capacity) in procedure 5 is taken as rated capacity.

Examples 2 to 10 and Comparative Examples 1 to 3

The batteries were produced in the same manner as in example 1 except that natural graphite (manufactured by Hitachi Chemical Co., Ltd., shape: flake graphite, average particle size: 20 μm) was used as the negative electrode active material in Comparative Example 1, natural graphite (manufactured by Hitachi Chemical Co., Ltd., shape: flake graphite, average particle size: 10 μm) was used as the negative electrode active material in Comparative Example 3, natural graphite (manufactured by Hitachi Chemical Co., Ltd., shape: flake graphite, average particle size: 35 μm) was used as the negative electrode active material in Comparative Example 4, the press pressure of the electrode was adjusted so as to have the density and surface roughness of the negative electrode active material layer presented in Table 1, a separator having the Gurley value or the porosity presented in Table 1 was used, and the batteries were pressurized so as to have the group pressure of the outer casing presented in Table 1.

TABLE 1

| | Density of positive electrode (g/cm$^3$) | Density of negative electrode (g/cm$^3$) | Surface roughness of negative electrode (Ra) (μm) | Gurley value of separator (Sec./100 cc) | Porosity of separator | Group pressure (kgf/cm$^2$) |
|---|---|---|---|---|---|---|
| Example 1 | 3.0 | 1.5 | 0.7 | 200 | 55% | 0.5 |
| Example 2 | 3.0 | 1.5 | 0.7 | 170 | 60% | 0.5 |
| Example 3 | 3.0 | 1.5 | 0.7 | 200 | 55% | 0.7 |
| Example 4 | 3.0 | 1.5 | 0.7 | 200 | 40% | 0.5 |
| Example 5 | 3.0 | 1.5 | 0.7 | 200 | 55% | 0.1 |
| Example 6 | 3.0 | 1.5 | 0.7 | 300 | 45% | 0.5 |
| Example 7 | 3.0 | 1.5 | 0.7 | 150 | 70% | 0.5 |
| Example 8 | 3.0 | 1.5 | 0.7 | 200 | 55% | 0.05 |
| Example 9 | 3.0 | 1.5 | 0.7 | 200 | 55% | 0.8 |
| Example 10 | 3.0 | 1.3 | 1.0 | 200 | 55% | 0.5 |
| Comparative Example 1 | 3.0 | 1.7 | 0.5 | 200 | 55% | 0.5 |
| Comparative Example 2 | 3.0 | 1.6 | 0.4 | 200 | 55% | 0.5 |
| Comparative Example 3 | 3.0 | 1.5 | 1.2 | 200 | 55% | 0.5 |

(Evaluation of Battery)

1. Initial Charge Process of Single Battery

The non-aqueous electrolyte secondary battery (single battery) produced in the above manner was evaluated by a charge and discharge performance test. For this charge and discharge performance test, the initial charge was conducted by holding the battery in a constant temperature bath kept at 25° C. for 24 hours. The initial charge of the battery was conducted as follows. The battery was charged to 4.2 V at a current value of 0.05 CA by constant current charge (CC)

and then at constant voltage (CV) for 25 hours in total. Thereafter, the battery was held for 96 hours in a constant temperature bath kept at 40° C. Thereafter, the battery was discharged to 2.5 V in a constant temperature bath kept at 25° C. at a current rate of 1 C and then provided with a rest time of 10 minutes.

2. Evaluation of Battery

The non-aqueous electrolyte secondary battery (single battery) produced in the above manner was evaluated by a charge and discharge performance test. For this charge and discharge performance test, the battery temperature was adjusted to 45° C. in a constant temperature bath kept at 45° C., and then the performance test was conducted. The charge of the battery was conducted to 4.2 V at a current rate of 1 C by constant current charge (CC) and then charged at constant voltage (CV) for 2.5 hours in total. Thereafter, the battery was provided with a rest time of 10 minutes, then discharged to 2.5 V at a current rate of 1 C, and then provided with a rest time of 10 minutes. The charge and discharge performance test was conducted by adopting these as one cycle. The proportion of the discharge capacity after 300 cycles and after 500 cycles with respect to the initial discharge capacity was adopted as the capacity retention. The results are presented in Table 2.

TABLE 2

|  | Capacity retention after 300 cycles | Capacity retention after 500 cycles |
| --- | --- | --- |
| Example 1 | 82% | 75% |
| Example 2 | 82% | 76% |
| Example 3 | 82% | 74% |
| Example 4 | 82% | 75% |
| Example 5 | 82% | 73% |
| Example 6 | 80% | 68% |
| Example 7 | 79% | 68% |
| Example 8 | 78% | 65% |
| Example 9 | 79% | 68% |
| Example 10 | 82% | 73% |
| Comparative Example 1 | 75% | 63% |
| Comparative Example 2 | 74% | 62% |
| Comparative Example 3 | 72% | 60% |

From the above results, it can be seen that the batteries of Examples 1 to 10 have a high capacity retention after a long-term cycle as compared with the batteries of Comparative Examples 1 to 3.

The invention claimed is:

1. A non-aqueous electrolyte secondary battery comprising a power generating element including
a positive electrode in which a positive electrode active material layer is formed on a surface of a positive electrode current collector,
a negative electrode in which a negative electrode active material layer is formed on a surface of a negative electrode current collector,
a separator, and
a pressure member to apply pressure to an outer casing so as to have a group pressure applied to the power generating element of from 0.07 to 0.7 kgf/cm$^2$,
wherein the density of the negative electrode active material layer is from 1.3 to 1.6 g/cm$^3$,
the negative electrode active material layer contains an aqueous binder, and
the surface center line average roughness (Ra) of a surface of the negative electrode active material layer that is on a separator side of the negative electrode active material layer is from 0.5 to 0.9 µm.

2. The non-aqueous electrolyte secondary battery according to claim 1, wherein an air permeability of the separator is 200 sec/100 cc or less.

3. The non-aqueous electrolyte secondary battery according to claim 1, wherein a porosity of the separator is from 40 to 65%.

4. The non-aqueous electrolyte secondary battery according to claim 1, wherein the power generating element has a structure sealed by the outer casing, the outer casing being a laminate film containing aluminum.

5. The non-aqueous electrolyte secondary battery according to claim 1, wherein the power generating element has a structure sealed by the outer casing and an internal volume of the outer casing is greater than a volume of the power generating element.

6. The non-aqueous electrolyte secondary battery according to claim 1, wherein the negative active material layer has a rectangular shape and a length of a shorter side of the rectangular shape is 100 mm or more.

7. The non-aqueous electrolyte secondary battery according to claim 1, wherein a ratio of a battery area, defined as a projected area of the battery including an outer casing of the battery, to rated capacity is 5 cm$^2$/Ah or more and the rated capacity is 3 Ah or more.

8. The non-aqueous electrolyte secondary battery according to claim 1, wherein the positive electrode active material layer has a rectangular shape and an aspect ratio of an electrode defined as a longitudinal/transversal ratio of the rectangular shaped positive electrode active material layer is from 1 to 3.

9. The non-aqueous electrolyte secondary battery according to claim 1, wherein the aqueous binder contains at least one rubber binder selected from the group consisting of a styrene-butadiene rubber, an acrylonitrile-butadiene rubber, a methyl methacrylate-butadiene rubber, and a methyl methacrylate rubber.

10. The non-aqueous electrolyte secondary battery according to claim 9, wherein the aqueous binder contains a styrene-butadiene rubber.

11. The non-aqueous electrolyte secondary battery according to claim 1, wherein the surface center line average roughness (Ra) of a surface of the negative electrode active material layer that is on a separator side of the negative electrode active material layer is from 0.5 to 0.7 µm.

* * * * *